US007328784B2

(12) United States Patent

Schinelli et al.

(10) Patent No.: US 7,328,784 B2

(45) Date of Patent: Feb. 12, 2008

(54) LABELING MACHINE

(75) Inventors: Nicola Schinelli, Mantova (IT); Andrea Sarzi Madidini, Goito (IT)

(73) Assignee: Global Packaging Solutions S.R.L., Rivalta Sul Mincio (IT)

( * ) Notice: Subject to any disclaimer, the term of this patent is extended or adjusted under 35 U.S.C. 154(b) by 0 days.

(21) Appl. No.: 10/909,417

(22) Filed: Aug. 3, 2004

(65) Prior Publication Data

US 2005/0028940 A1 Feb. 10, 2005

(30) Foreign Application Priority Data

Aug. 8, 2003 (IT) ........................ MN2003A0036

(51) Int. Cl.
*B65G 47/244* (2006.01)

(52) U.S. Cl. .............................. 198/459.2; 198/459.3; 198/379; 198/617; 198/624

(58) Field of Classification Search ............ 198/459.2, 198/459.3, 379, 617, 624; *B65C 3/06*
See application file for complete search history.

(56) References Cited

U.S. PATENT DOCUMENTS

| | | | | |
|---|---|---|---|---|
| 3,934,714 | A * | 1/1976 | Matsumoto | 198/379 |
| 4,280,612 | A * | 7/1981 | Nagano | 198/379 |
| 4,428,474 | A * | 1/1984 | Gau et al. | 198/394 |
| 4,437,289 | A * | 3/1984 | Bedin | 53/64 |
| 4,594,123 | A * | 6/1986 | Eder | 156/456 |
| 4,994,135 | A * | 2/1991 | Orlandi | 156/362 |
| 5,001,878 | A * | 3/1991 | Sanfilippo et al. | 53/510 |
| 5,137,136 | A * | 8/1992 | Humele | 198/394 |
| 5,224,586 | A * | 7/1993 | Naka et al. | 198/803.11 |
| 5,415,268 | A * | 5/1995 | Lofgren | 198/394 |
| 5,695,041 | A * | 12/1997 | Kouda et al. | 198/459.2 |
| 5,718,030 | A * | 2/1998 | Langmack et al. | 29/426.3 |
| 5,858,143 | A * | 1/1999 | Bright et al. | 156/86 |
| 6,805,182 | B2 * | 10/2004 | Ballarotti | 156/556 |

FOREIGN PATENT DOCUMENTS

| | | | |
|---|---|---|---|
| DE | 19630690 | A1 * | 2/1998 |
| DE | 19741476 | A1 * | 3/1999 |
| EP | 1 122 173 | | 8/2001 |
| GB | 1 565 718 | | 4/1980 |

* cited by examiner

*Primary Examiner*—Gene O. Crawford
*Assistant Examiner*—Leslie A Nicholson, III
(74) *Attorney, Agent, or Firm*—Modiano & Associati; Albert Josif; Daniel J. O'Byrne

(57) ABSTRACT

A labeling machine that is provided with a rotating carousel supporting at a peripheral region a plurality of pans and with an input star conveyor for conveying bottles to be labeled to the rotating carousel. Each pan is adapted to receive and support a bottle when it is located in a specific position following to the rotation of the carousel. A toothed belt actuated by a driving pulley is wound around the carousel for driving the pans in rotation while they travel, along a path extending along the peripheral region of the carousel, between a rotation start position and a rotation end position. The rotation start position is located upstream, in the direction of rotation of the carousel, with respect to the specific bottle receiving position.

8 Claims, 4 Drawing Sheets

LABELING MACHINE

BACKGROUND OF THE INVENTION

Labeling machines are known which, according to a widespread type, comprise a rotating carousel that supports, at its peripheral region, a plurality of pans, each whereof is designed to receive and support a bottle that is conveyed by an input star conveyor when, as a consequence of the rotary motion of the carousel, it is in a specific position at such star conveyor.

Labeling machines are known that in order to operate on specific types of labels, such as for example labels imprinted consecutively, one after the other, on a film that unwinds from a reel, have means adapted to rotate the pans about their own axis while they travel, entrained by the rotating carousel, along a portion comprised between a rotation start position and a rotation end position.

Commonly, the means adapted to rotate the pans about their own axis comprise a toothed belt, which is designed to make contact with pulleys that are rigidly coupled to said pans, and in conventional machines such belt is subjected to intense stresses, which cause a limited life of the belt.

SUMMARY OF THE INVENTION

The aim of the present invention is to provide a labeling machine in which the means designed to rotate the pans about their own axis, and particularly the belt comprised within said means, are subjected to very limited stress conditions.

This aim is achieved by a labeling machine, according to the invention, comprising a rotating carousel that supports, at a peripheral region thereof, a plurality of pans, each of which is designed to receive and support a bottle that is conveyed by an input star conveyor when, as a consequence of a rotary motion of the carousel, the bottle is in a specific position, said pans being provided with means adapted to turn said pans about an axis thereof while said pans travel, entrained by the carousel, along a portion that is comprised between a rotation start position and a rotation end position, characterized in that said rotation start position is arranged upstream, in the direction of rotation of the carousel, with respect to a position in which each pan receives and supports a bottle.

BRIEF DESCRIPTION OF THE DRAWINGS

Further characteristics and advantages will become better apparent from the description of a preferred but not exclusive embodiment of the labeling machine, according to the invention, illustrated by way of nonlimiting example in the accompanying drawings, wherein.

DESCRIPTION OF THE PREFERRED EMBODIMENTS

Figure 1:
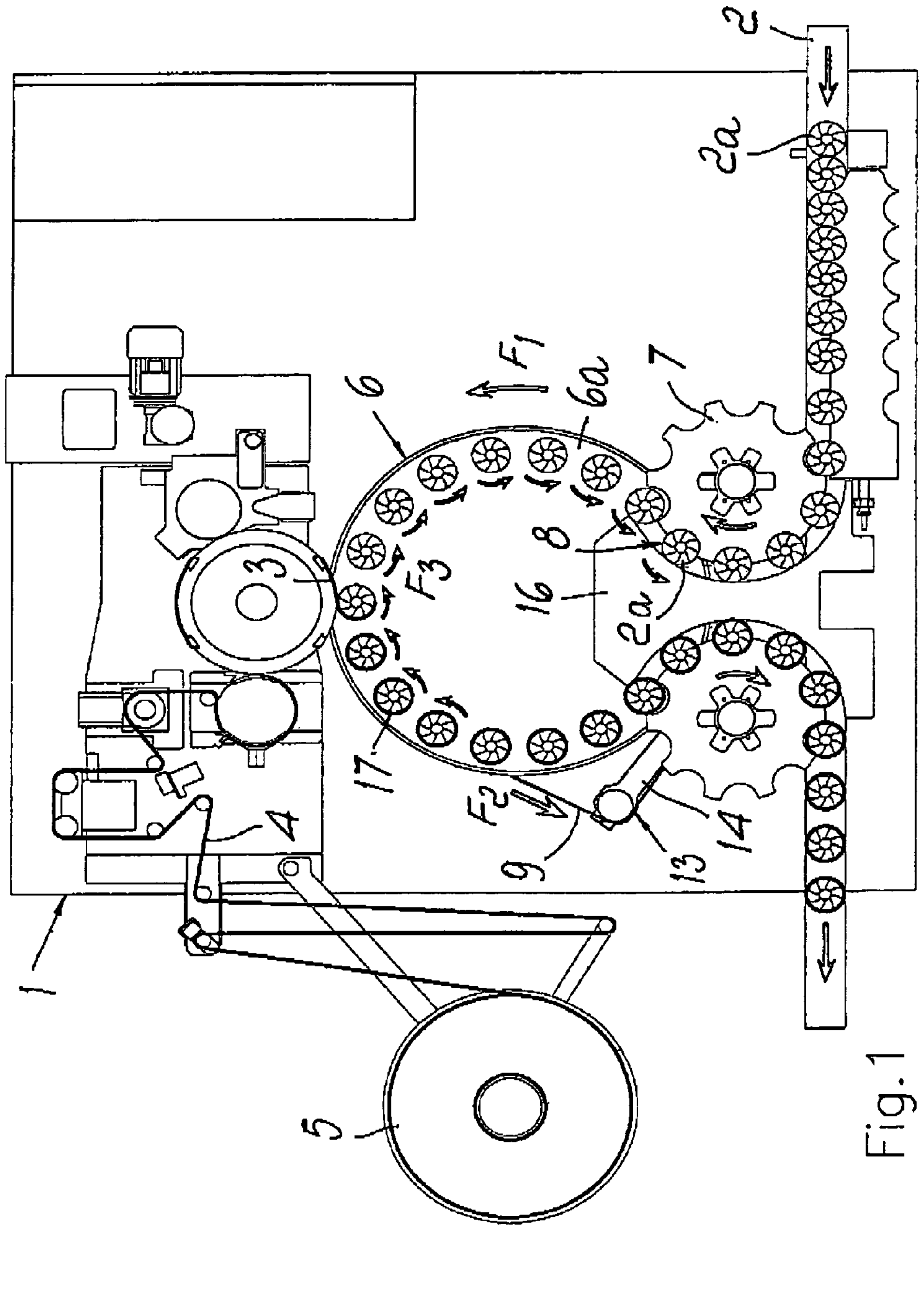
FIG. 1 is a schematic plan view of the labeling machine according to the invention.

With reference to the figures, the reference numeral 1 generally designates a labeling machine designed to apply to bottles 2*a*, conveyed by a line 2, labels 3, which are gradually taken by cutting from a film 4 that unwinds from a reel 5.

Figure 2:
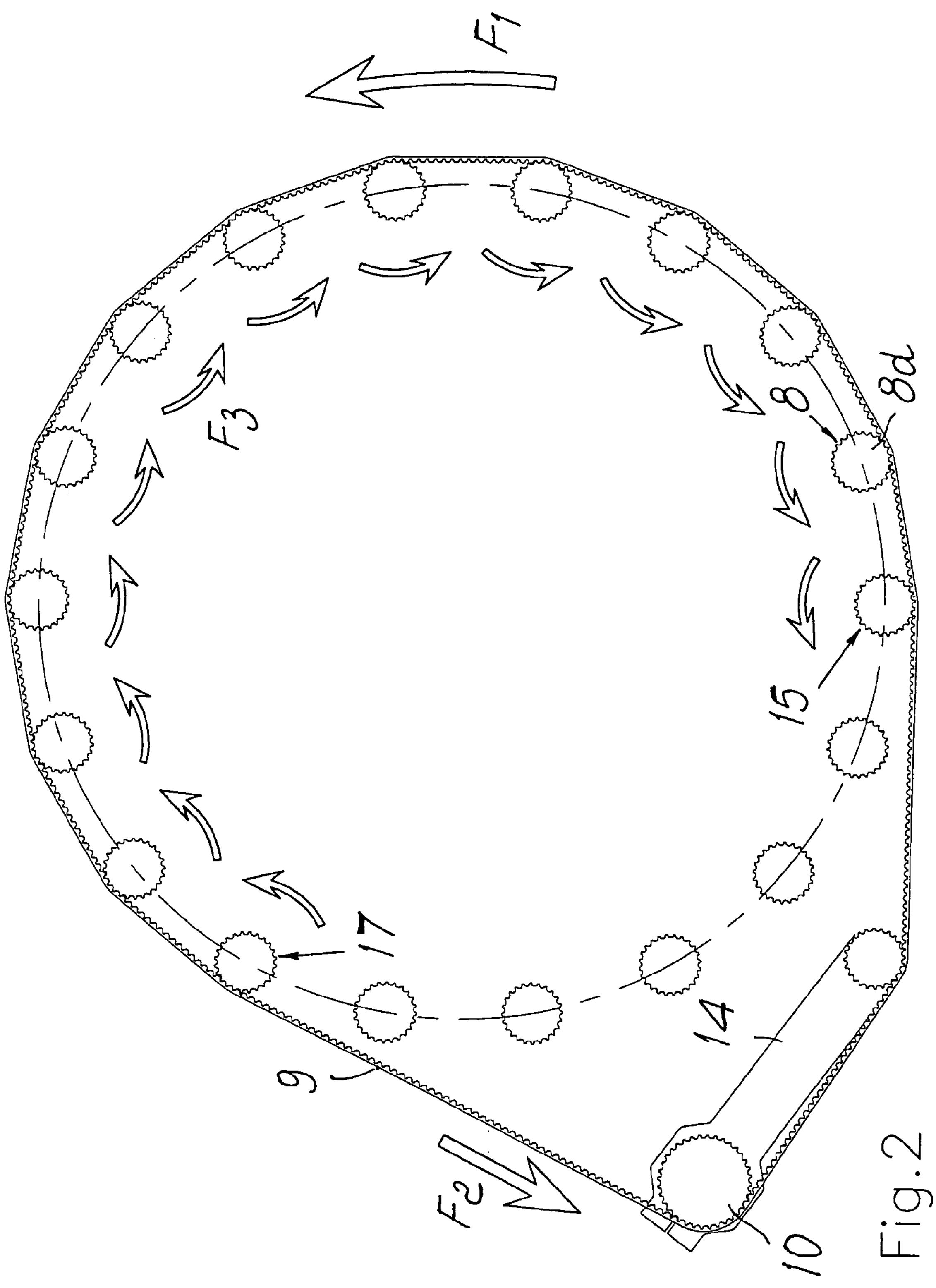
FIG. 2 is another plan view of some details of the labeling machine.

Such machine comprises a carousel 6, which rotates in the direction of the arrow F1 and supports at its peripheral region a plurality of identical pans, each designed to receive and support a bottle that is conveyed by an input star conveyor 7 when, as a consequence of the rotary motion of the carousel, it is in the very specific position that faces said star, designated by the reference numeral 8 in FIGS. 1 and 2.

Figure 3:
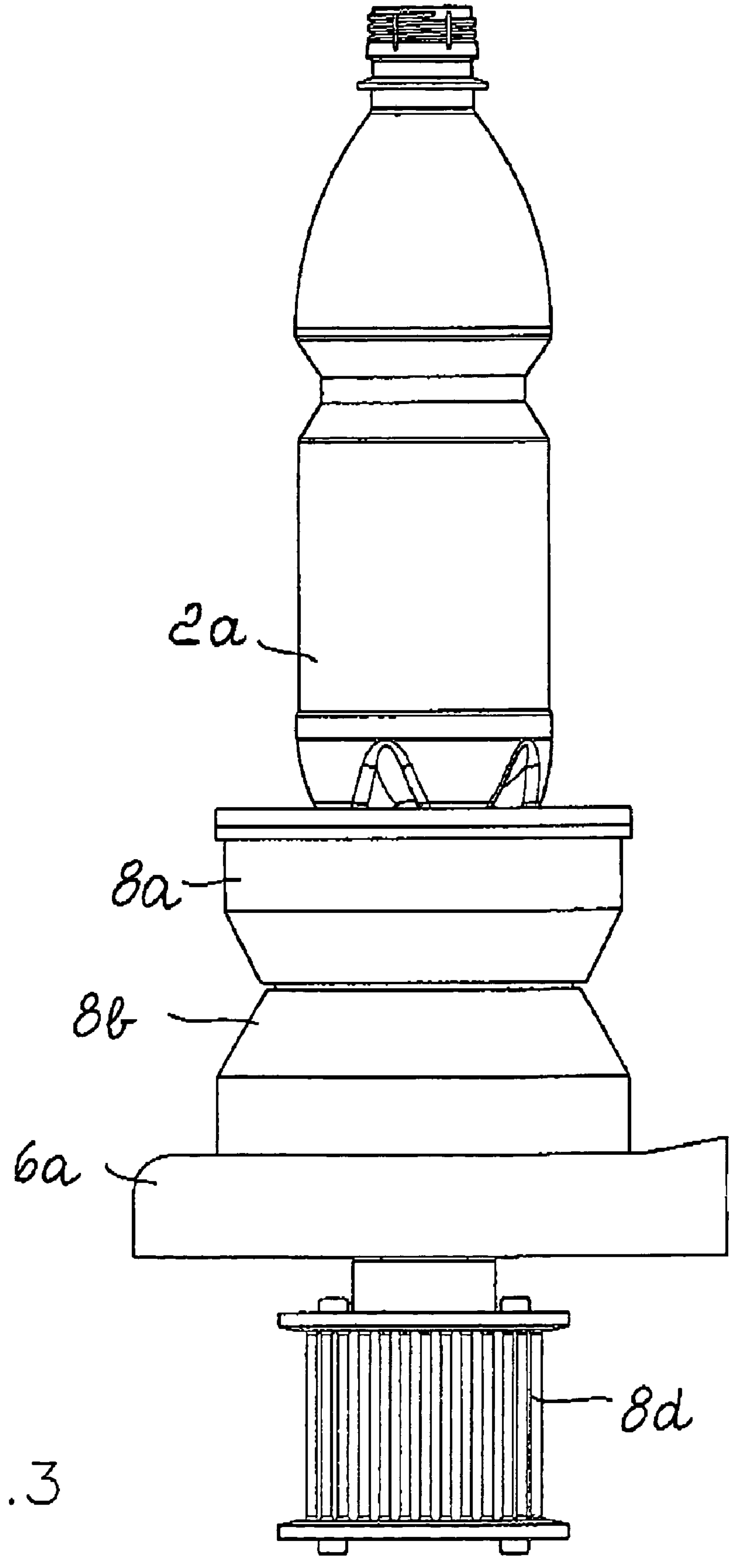
FIG. 3 is a side view of a pan with a bottle rested thereon.

In such position 8, at the instant shown in the figures, there is, as shown in FIG. 3, a pan 8*a*, which is associated so that it can rotate about its own axis with a support 8*b*, which is fixed to a surface 6*a* of the carousel 6; such pan 8*a* supports a bottle 2*a* and is connected to a tooted pulley 8*d* described hereinafter.

As mentioned, all the pans supported by the carousel 6 are identical and therefore they all have the configuration described above.

Figure 4:
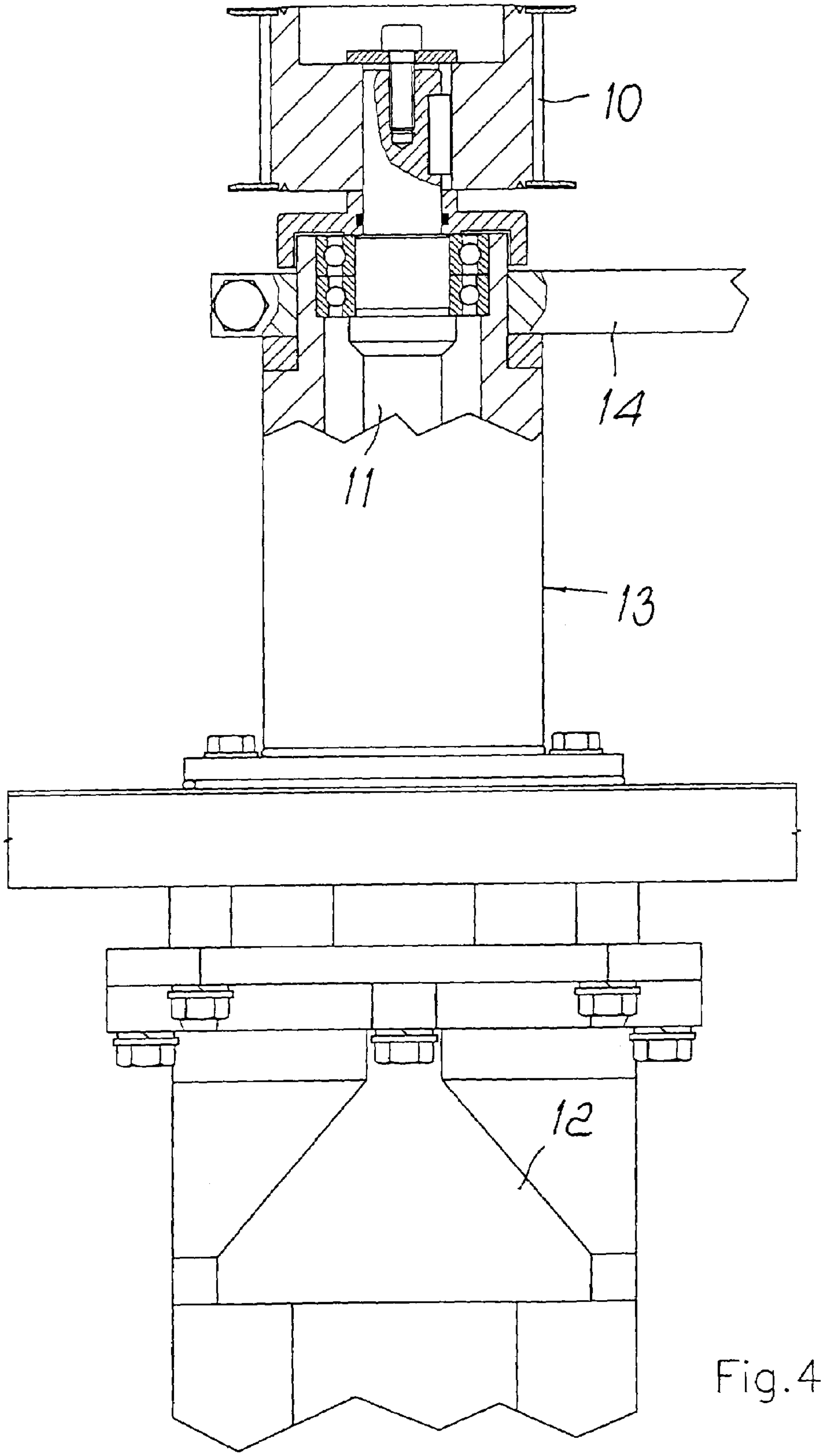
FIG. 4 is a partially sectional view of the motor assembly.

Furthermore, the reference numeral 9 designates a toothed belt, which is actuated so as to move in the direction of the arrow F2 by a driving pulley 10, which is associated with an output shaft 11 of an electric motor 12 comprised within a motor assembly 13, which is shown in particular in FIG. 4, in the presence of a belt tensioner 14.

The belt 9 winds around the carousel 6 and makes contact with the pulleys, such as 8*d*, which are rigidly coupled to the pans that as a consequence of the rotation of the carousel, are comprised between a rotation start position, designated by the reference numeral 15 in FIG. 2 and not shown in FIG. 1 because it lies below a complementary star conveyor element 16, and a rotation end position, designated by the reference numeral 17 in FIGS. 1 and 2; accordingly, all the pulleys with the corresponding bottle supporting pans that are present in the portion comprised between the positions 15 and 17 are turned in the direction of the arrows such as F3, and the labeling operation is performed correctly.

The toothed belt 9 is arranged so as to provide the condition in which the position 15 in which the pans start rotating is located upstream, in the direction of rotation of the carousel 6 designated by the arrow F1, with respect to the position 8 in which each pan receives and supports a bottle.

In this manner, the pans are turned when they are not yet loaded, and therefore the belt 9 is subjected to low stresses, thereby allowing a longer life of the belt.

The described labeling machine according to the invention is susceptible of numerous modifications and variations, all of which are within the scope of the appended claims; for example, it is evident that the labeling assembly is not limited to the one disclosed above.

The disclosures in Italian Patent Application No. MN2003A000036 from which this application claims priority are incorporated herein by reference.

What is claimed is:

1. A labeling machine, comprising:

a rotating carousel;

an input star conveyor for conveying bottles to said rotating carousel;

a plurality of pans supported at a peripheral region of the rotating carousel so that each pan of said plurality of pans is rotatable about an axis thereof and is further adapted to receive and support a bottle that is conveyed by said input star conveyor when, as a consequence of a rotary motion of the carousel, the pan is in a specific position for receiving and supporting the bottle;

a toothed belt wound around the carousel for driving cooperation with the pans; and a driving pulley for actuating said toothed belt to rotate the pans about the axis thereof while the pans travel, entrained by the carousel, along a path extending between a pan rotation start position and a pan rotation end position, said pan rotation start position being arranged upstream in the path of the bottles, in a direction of rotation of the carousel, with respect to said specific position in which each said pan, already in rotation, receives and supports a bottle.

2. The labeling machine of claim 1, further comprising a plurality of supports, each of which is fixed at the peripheral region of the rotating carousel so as to support a respective one of said pans and rotate therewith about said pan axis.

3. The labeling machine of claim 2, further comprising a plurality of toothed pulleys, each of which is rigidly connected to a respective pan, said toothed belt drivingly engaging said toothed pulleys between said pan rotation start position and pan rotation end position.

4. The labeling machine of claim 1, further comprising a motor assembly for actuating said driving pulley so as to drive said toothed belt in a rotation direction which is the same as that of the rotating carousel.

5. The labeling machine of claim 4, wherein said motor assembly is provided with a belt tensioner for adjusting tensioning of said toothed belt.

6. The labeling machine of claim 1, further comprising a complementary star conveyor that is arranged so as to overlay said pan rotation start position.

7. A labeling machine, comprising;

a rotating carousel:

an input star conveyor for conveying bottles to said rotating carousel;

a plurality of pans supported at a peripheral region of the rotating carousel so that each pan of said plurality of pans is rotatable about an axis thereof and is further adapted to receive and support a bottle that is conveyed by said input star conveyor when, as a consequence of a rotary motion of the carousel, the pan is in a specific position for receiving and supporting the bottle;

a toothed belt wound around the carousel for drivingly engaging the pans between pan rotation start and end positions thereof; and a driving pulley for actuating in rotation said toothed belt to rotate the pans about the axis thereof while the pans travel, entrained by the carousel, along a path that extends between said pan rotation start and end positions, and wherein said pan rotation start position is arranged upstream in the path of the path of the bottles, in a direction of rotation of the carousel, with respect to said specific position in which each pan receives and supports a bottle, so that each one of said pans is actuated in rotation about its axis by said toothed belt before and while receiving the bottle in said specific position.

8. A labeling machine comprising a rotating carousel in combination with a driving, rotatable toothed belt, the machine further comprising:

an input star conveyor for conveying bottles to said rotating carousel;

a plurality of pans supported at a peripheral region of the rotating carousel so that each pan of said plurality of pans is rotatable about an axis thereof and is further adapted to receive and support a bottle that is conveyed by said input star conveyor when, as a consequence of a rotary motion of the carousel, the pan is in a specific position for receiving and supporting the bottle, said toothed belt being wound around the carousel and drivingly engaging the pans between pan rotation start and end positions thereof;

and a driving pulley for actuating in rotation said toothed belt to rotate the pans about the axis thereof while the pans travel, entrained by the carousel, along a path extending between said pan rotation start and end positions, said pan rotation start position being arranged upstream in the path of the path of the bottles, in a direction of rotation of the carousel, with respect to said specific position in which each said pan receives and supports a bottle.

* * * * *